Oct. 14, 1958        C. A. ROCK        2,855,700

PICK-A-PICTURE EDUCATIONAL TOY

Filed July 10, 1956        2 Sheets-Sheet 1

*INVENTOR.*
CLARENCE A. ROCK
BY R. W. Hodgson

Oct. 14, 1958 C. A. ROCK 2,855,700
PICK-A-PICTURE EDUCATIONAL TOY
Filed July 10, 1956 2 Sheets-Sheet 2
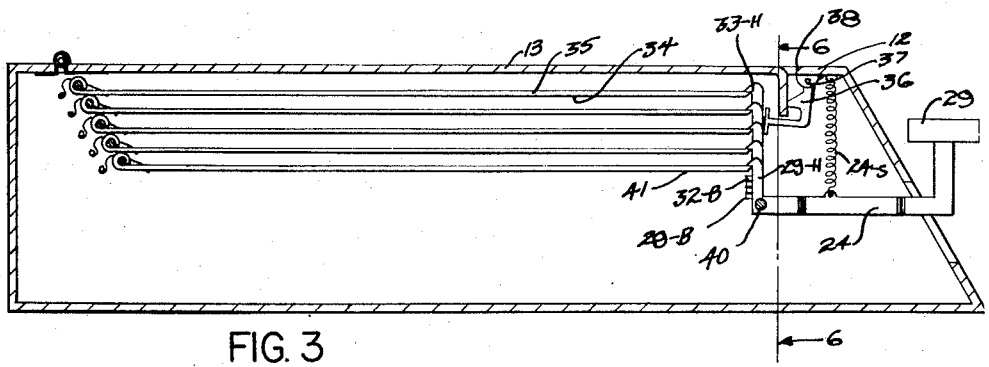
FIG. 3
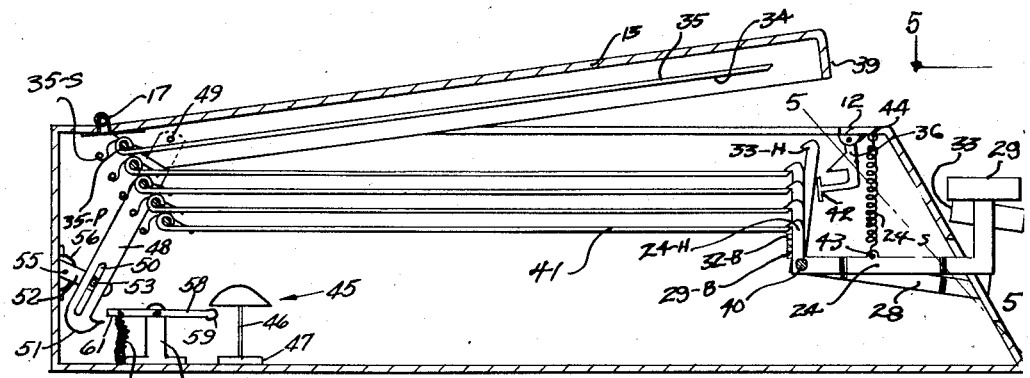
FIG. 4
FIG. 5
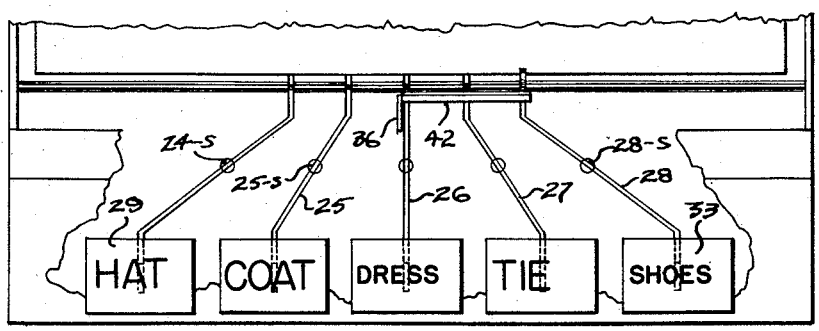
FIG. 7 FIG. 8
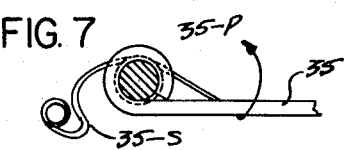
INVENTOR.
CLARENCE A. ROCK
BY R. W. Hodgson

United States Patent Office 2,855,700
Patented Oct. 14, 1958

2,855,700
PICK-A-PICTURE EDUCATIONAL TOY

Clarence A. Rock, Costa Mesa, Calif., assignor of one-tenth to Gadget-of-the-Month Club, Inc., Los Angeles, Calif., a corporation of California Application July 10, 1956, Serial No. 596,888

3 Claims. (Cl. 35—6)

This invention relates to toys for young children, and more particularly to an educational toy conformed to resemble a cash register and having the names of familiar objects on the keys which when pressed bring a corresponding picture into view.

The name which I have given the toy, Pick-a-Picture, is indicative of its broad purpose beyond that of furnishing amusement for rather young children. It is intended for children of pre-school age, and one of its main objects is to develop an association in the child's mind between simple words and objects with which he is familiar in everyday life.

Actually, the toy of my invention is a playtime counterpart of the so-called flash card method used in more progressive kindergarten-primary schools for developing a recognition of words by associating them with objects. Furthermore, it is a basic toy around which youngsters can develop their own games and contests. My invention can be said to have a plurality of important objectives.

One important object of my invention is the provision of a toy combining mechanical novelty and educational value.

Another important object of my invention is the provision of a toy of the character described being adapted to provide entertainment and word familiarity to children of nursery school and kindergarten age.

A further object of the present invention is the provision of a toy of the character described adapted to build familiarity with words by associating them with familiar objects.

An additional object of my invention is the provision of a toy appealing to young children in which the interest provoking elements may be changed at frequent intervals to maintain the interest of the users over a longer period of time.

In brief, the toy of my invention includes an enclosure resembling a flat, horizontal type of cash register, and has a plurality of wide keys extending forwardly therefrom. Each of the keys has a short word on its upper surface, the word being the name of an animal or object with which the child is normally familiar. Pressure upon a selected key releases the hinged lid of the cabinet enclosure and reveals a mounted picture of the object corresponding to the name on the key depressed.

Further important objects of my invention will be readily recognized in the following description of one preferred embodiment when it is read with reference to the accompanying drawings, of which:

Figure 3 is a side elevational sectional view taken along the line and in the direction indicated by the arrows 3—3 in Figure 2;

Figure 4 is a sectional view similar to Figure 3 showing the operation of the device in which one of the keys is depressed;

Figure 5 is a diagrammatic fragmentary view seen from the direction of the arrow 5 in Figure 4 with a portion of the cabinet designated by the line 5—5 removed;

Figure 7 is a diagrammatic detail view of the hinge members seen in Figures 3 and 4; and Figure 8 is an enlarged detail diagram of the lid-engaging hook member seen in Figures 3 and 4.

Figure 1:
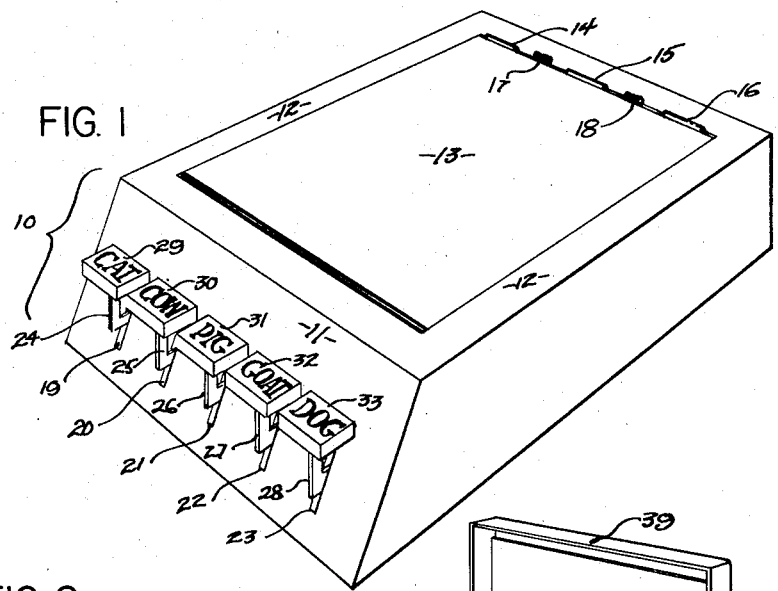
Figure 1 is a diagrammatic perspective view showing the exterior and the keys of the toy of my invention.

Reference is again made to Figure 1 showing a Pick-a-Picture toy constructed according to my invention in which the numeral 10 designates the cabinet enclosure which is seen to have a front panel 11, a generally flat top 12 in which a movable lid member 13 inset and attached thereto with a plurality of hinges such as 14, 15 and 16 and urged upwardly by a plurality of spring members such as 17 and 18. A plurality of slots indicated by the numerals 19, 20, 21, 22 and 23 is disposed through the diagonally disposed frontal panel 11 of the cabinet 12 and are adapted to receive therethrough the operating arms 24, 25, 26, 27 and 28 which respectively support the indicia-bearing key members 29, 30, 31, 32 and 33, movably therein.

Figure 2:
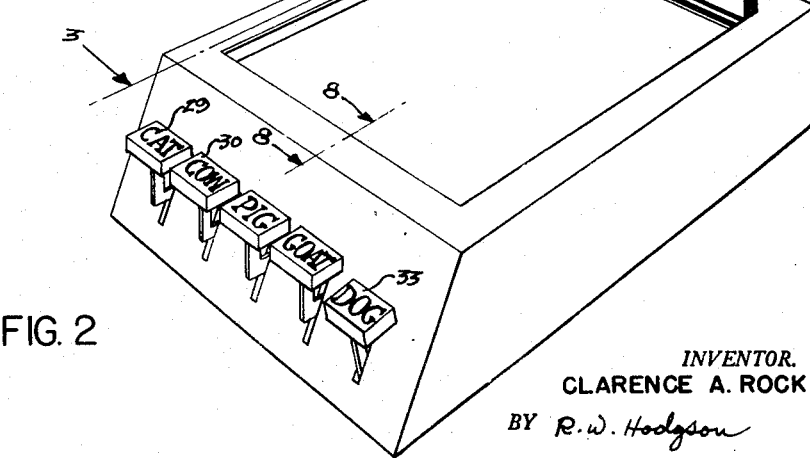
Figure 2 is a similar view showing one of the keys depressed and the picture corresponding therewith exposed to view.

A plurality of pictures are mounted on flat generally rigid picture panels as in Figure 3 in which the picture of the dog seen in Figure 2 is mounted on the undersurface 34 of the panel 35.

The lid 13 is permitted to swing upwardly by disengagement of the hook 36 which is pivotally attached to the upper surface 12 of the cabinet 10 at the pivot point 37, the hook 36 being thus adapted to engage a slot 39 in the downwardly disposed forward edge 38 of the lid 13, the slot 39 being best seen in Figure 2.

Referring again to Figure 3, the operating arm 24, supporting the key 29, is pivotally mounted at 40 and is terminated upwardly in a hook member designated as 24–H, thus pressure upon the key 29 depresses the arm 24 and causes the hook member 24–H to move outwardly from the edge of the picture panel 41.

This relative mechanical movement is the same for all of the keys. In Figure 4 the key 33 shown in Figure 2 is depressed, thereby causing its respective hook member 33–H to move outwardly from the adjacent edge of the picture panel 34, and in so doing it engages the contact arm 42 of the hook member 36 pressing it outwardly of the slot 39 in the lid 13. As is seen in Figures 3 and 4, the picture panels of which panel 35 is typical, are pivotally attached to the sides of the cabinet as seen at 35–P and are urged to rotate upwardly by springs such as 35–S; thus the outward movement of the hook 33–H simultaneously releases the lid 13 and the picture panel 35, permitting the latter to swing upwardly with its undersurface 34, having the picture mounted thereon, exposed to the view of a person pressing the key, as shown in Figure 2.

A plurality of coiled springs such as 24–S is disposed between attachment points as seen at 43 on the arm 24, and hook members as at 44 on the undersurface of the cabinet top 12.

The positioning of the springs such as 44 is also indicated in Figure 5 which is a fragmentary view taken from Figure 4 with a portion of the cabinet defined by the line 5—5 broken away to reveal interior details including the coil springs serving each of the operating arms such as 24–S, 25–S, et cetera, and more particularly the manner in which the hook member 36 is adapted with an extended contact bar 42 which is seen to be engageable by any of the operating arms 26, 27 or 28.

The extended contact bar 42 is used in the position shown to permit positioning of the hook member 36 in the center of the lid where its operation induces a minimum of strain and twist reaction in the lid.

As will be understood from the figures, the key 33 which is at the right in the various figures is adapted with the longest hook member 33–H, and therefore it is free to operate independently of the shorter hooks which engage the picture panels therebelow. However, in order for the shortest of the hooks, 29–H to release its corresponding picture panel 41, it is necessary that all of the longer hooks be simultaneously released. For this purpose a series of cross rods is provided as indicated in Figure 6, which is a fragmentary sectional elevational view taken along the line 6—6 in Figure 3.

Figure 6:
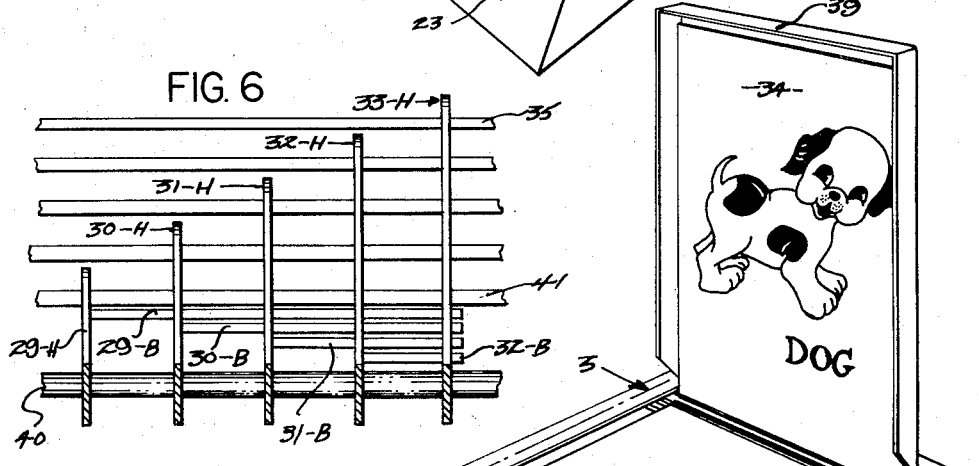
Figure 6 is a fragmentary frontal elevational view of the interior mechanism taken along the line and in the direction of the arrows 6—6 in Figure 3.

As is clearly seen in Figure 6, each of the cross rods, 29–B, 30–B, et cetera, is fixedly attached to its respective hook member and extends therefrom to the right transversely of each of the longer hook members with the rod 29–B of the shortest hook member 29–H extending transversely of all of the longer hooks. Similarly, the rod 30–B attached to the hook 30–H is extended transversely of all of the hooks except the shorter one, 29–H.

Because of the progressive overlapping of the cross bars as described above, pressure upon either of the two shortest hooks 29–H and 30–H is effective to release the lid 13 although the hooks do not directly engage the contact bar 42 of the hook 36.

To further simulate a conventional cash register, a bell designated by the numeral 45 in Figure 4 is supported interiorly of the cabinet on a post 46 extended upwardly from a base 47. A lever arm 48 is pivotally attached at 49 to the lid 13, and is provided with a longitudinally extended slot 50 and is terminated downwardly in a hook portion 51. A linkage member 52 is slidably attached to the arm 48 by a bolt 53 which is adapted to slide in the slot 50 and is pivotally attached at 55 to the bracket 56 secured to the inner surface of the rearward end of the cabinet. Pivotally disposed on the post 57 is an arm 58 having a weighted clapper 59 on one end and being held in generally horizontal positioning by the spring 60 at its opposite end 61. As can be seen in the figure, raising the lid 13 moves the arm 48 upwardly causing the hook 51 to raise the end 61 of the arm 58 and causing it to swing back under tension of the spring 60 thereby bringing the clapper 59 into momentary contact with the bell 45 to produce a musical note as the lid is raised.

As indicated in Figure 5 in which a different set of words is seen on the keys, it is the intention in connection with this invention to provide a plurality of series of words with properly related pictures which may be changed from time to time to prolong interest and broaden the educational scope of the toy.

Numerous modifications and variations of the present invention will occur to those skilled in the art after a careful study hereof. All such, properly within the basic spirit and scope of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. An educational toy, comprising: a generally rectangular shallow cabinet having a flat bottom normally positioned horizontally on a table top, and two parallel sides and one end fixedly disposed upwardly at right angles therefrom; a second end of said cabinet being angularly disposed inwardly from said bottom and having a plurality of vertically disposed slots therein, a lid adapted to fit within the open top of said cabinet and being hingedly attached at one end to the upper edge of said vertically disposed end of said cabinet; a plurality of flat picture panels dimensioned to fit under said lid and pivotally attached one above the other to said sides adjacent said vertical end of said cabinet; a plurality of longitudinally extended U-shaped arms disposed through said slots in said angularly disposed second end and being pivotally attached interiorly of said cabinet with both ends of said arms upwardly disposed; said ends positioned interiorly of said cabinet being conformed to define hook members adapted to engage said picture panels and said ends disposed exteriorly of said slots being fitted with horizontally disposed key members having identifying indicia thereon; tension means for holding said arms upwardly in said slots; tension means adapted to rotate said lid and said picture panels upwardly relative to the hinge and pivot lines thereof, and a plurality of pictures mounted on the undersurfaces of said picture panels.

2. The invention in accordance with claim 1 being further characterized by bell means disposed in said cabinet and clapper means associated with said lid and movable therewith whereby a musical tone is sounded when said lid is raised.

3. The invention in accordance with claim 2 and further characterized by each of said pictures being individually associated with the respective key and said indicia thereon effective to release it to swing upwardly from within said cabinet.

References Cited in the file of this patent

UNITED STATES PATENTS

| 521,668 | Potteiger et al. | June 19, 1894 |
| 925,716 | McAnulty | June 22, 1909 |
| 1,370,826 | Mathis | Mar. 8, 1921 |
| 2,494,167 | Faas | June 10, 1950 |

FOREIGN PATENTS

| 608,112 | Germany | Jan. 16, 1935 |